United States Patent [19]

Bauduin et al.

[11] Patent Number: 4,638,018

[45] Date of Patent: Jan. 20, 1987

[54] ACRYLIC TELOMERS WITH GRAFTS WHICH CAN BE CROSS LINKED BY LIGHT, THEIR SYNTHESIS AND THEIR APPLICATIONS IN COATING METALS

[75] Inventors: Gerard Bauduin; Bernard Boutevin, both of Montpellier; Willy-Jean Deiss, Grenoble; Yves Pietrasanta, Meze, all of France

[73] Assignee: Cegedur Societe de Transformation de l'Aluminium Pechiney, Paris, France

[21] Appl. No.: 686,547

[22] PCT Filed: Apr. 6, 1984

[86] PCT No.: PCT/FR84/00092

§ 371 Date: Dec. 10, 1984

§ 102(e) Date: Dec. 10, 1984

[87] PCT Pub. No.: WO84/04097

PCT Pub. Date: Oct. 25, 1984

[30] Foreign Application Priority Data

Apr. 11, 1983 [FR] France ............................ 83 06066

[51] Int. Cl.[4] ..................... C08F 2/50; C08F 22/16; C08F 20/38
[52] U.S. Cl. .................................. 522/103; 428/462; 522/149; 522/173; 522/183; 525/922; 526/312; 526/318.1; 526/318.2

[58] Field of Search ................. 204/159.16; 522/103, 522/149, 173, 183

[56] References Cited

U.S. PATENT DOCUMENTS 4,013,824 3/1977 Uranecr .......................... 526/205

FOREIGN PATENT DOCUMENTS 1308638 10/1962 France .
336 2/1983 World Int. Prop. O. .

*Primary Examiner*—John C. Bleutge
*Assistant Examiner*—A. H. Koeckert
*Attorney, Agent, or Firm*—Dennison, Meserole, Pollack & Scheiner

[57] ABSTRACT

The invention relates to acrylic telomers with grafts which can be cross linked by light, methods of synthesizing them and their applications. The telomers comprise a telogen of the mercaptan family, in particular dodecanethiol, and links of a taxogen of the acrylic family, some of which are grafted. The telomers are synthesized semi-continuously by radical initiation in the presence of initiators such as azobisisobutyronitrile, at a temperature below 75° C., making it possible to obtain a number of links adapted to the desired applications. Grafting is carried out by means of glycidyl and aziridinyl groups.

16 Claims, No Drawings

ACRYLIC TELOMERS WITH GRAFTS WHICH CAN BE CROSS LINKED BY LIGHT, THEIR SYNTHESIS AND THEIR APPLICATIONS IN COATING METALS

The invention relates to acrylic telomers with grafts which can be cross linked by light, their synthesis and their applications in coating metals and particularly aluminium.

Telomers are organic synthesised products resulting from a reaction known as telomerisation, during which a non-saturated compound Xi described as the taxogen reacts, in the presence of catalysts or initiators, with another compound AZ described as the telogen, giving rise to the formation of a sequence of n divalent —Xi— links and the division of the telogen into two parts, which are fixed onto the ends of the sequence to form a product of the general formula

These telomers can in turn act as a telogenic agent to another taxogen Yi and lead to the formation of dual-sequence cotelomers of the general formula: $A'—(Yi)_{n'}—(A''—(Xi)_n—Z$ where $A'$ and $A''$ result from the division of A.

Applicants have been most interested in derivatives of these telomers obtained by fixing non-saturated organic grafts on a limited number of links, more particularly grafts with at least one double bond which can be cross linked by light, so as to form grafted telomers of the general formula:

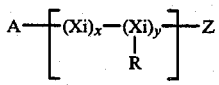

where $x+y=n$ and where x gives the number of non-grafted links and y the number of links on which the graft R has been fixed. These derivatives combine in their properties those of the non-grafted molecules of taxogen, which may e.g. have free acid or alcohol functions, making them well suited to adhere to metals, and those of grafted molecules which, in the present case, have a capacity for cross linking by the action of radiation. Thus in their French Pat. No. 2 510 125 Applicants describe grafted telomers of the general formula:

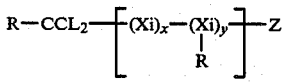

where the taxogen may be an acrylic acid.

In this case, however, the telogen is a halogen derivative such as carbon tetrachloride and the telomerising reaction necessitates the use of a catalyst of the redox type such as the ferric chloride/benzoin pair, with the disadvantage that telomerising speeds are relatively low and the products are coloured by the iron salts. The disadvantages due to the iron can indeed be avoided by carrying out telomerisation through radical initiation with a peroxide initiator such as benzoyl peroxide or azobisisobutyronitrile and by using bromotrichloromethane as the telogen. However, the coefficient of transfer $C_T$ of this compound, that is to say, the factor which determines what fraction of this element is liable to be fixed on the taxogen, although considerable, is still fairly small and leads to limited yields when reactions on an industrial scale are required.

In this patent, moreover, the telomers are synthesised discontinuously and the problem bound up with radical catalysts in this type of process is that of the polydispersion of the products obtained. As a matter of fact, since the degree of polymerisation varies with the concentration of the reagents, the compounds formed at the beginning of the reaction do not have the same degree of polymerisation as those obtained at the end of the operation. The polydispersion index, corresponding to the ratio of the mean number of molecules by weight to the mean number of molecules by number, is therefore 1.6 to 1.8, resulting in different products where the heterogeneity of their properties may be troublesome for certain applications. The various telomers can indeed be separated by solvent according to the value of n, but this operation has been found to be expensive and tedious.

With regard to the grafting, when a taxogen based on acrylic acid is used, for example, the graft employed may be allyl alcohol, cinnamic alcohol or ethylene glycol acrylate. In this case the bond between the compounds may be formed by esterification, a reaction which is relatively slow and incomplete and often ill-adapted to industrial application. The acid functions are therefore generally activated before grafting, by passing them through acid chloride, e.g. using thionyl chloride. This intermediate step makes it possible to achieve higher speeds and grafting rates but makes the process more complicated and thus less attractive.

Moreover the temperatures used to facilitate the reactions are sometimes high enough to cause premature cross linking, that is to say, cross linking before photon irradiation, so that the products obtained are often gelled and cannot therefore be used to make coatings.

All these drawbacks have led Applicants to develop new grafted telomers, which are synthesised by processes used industrially and which lend themselves to important applications.

Their work involved research on:
taxogens with a good capacity for telomerisation;
telogens with a high enough coefficient of transfer to give good conversion yields:
grafts which have good properties of cross linking by light and which contain groups enabling them to be grafted directly onto the telomer without resorting to any intermediate reactions, this being done at an appropriate speed and under temperature conditions compatible with obtaining a reduced amount of premature cross linking.

In addition Applicants have directed their development work to radical initiation reactions, so as to avoid the defects of redox systems and in particular the colouring of the products obtained by the iron. They have carried out these reactions so as to reduce the polydispersion index I and thus to make telomers which have more homogeneous degrees of polymerisation DPn and which do not require any separating operation. The combined choice of such telomers and such processes has given rise to products which have remarkable properties of flexibility and mechanical and chemical strength in respect of their applications.

The present invention firstly relates to telomers which can be cross linked by light, of the general formula

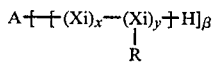

wherein the taxogen $X_i$ is a derivative of the family of acrylics, R the graft has at least one double bond which can be cross linked by light, $x+y \leq 100$, and A and H are elements of a telogen $AH_\beta$, where $AH_\beta$ is a mercaptan in which A has the formula $BS_\beta$ where B is an organic group, and $\beta \leq 2$.

Thus the new products claimed include taxogens $X_i$ belonging to the family of acrylics, which are known for their capacity to be telomerised through their ethylene bond. These acrylics have an acid function which is either free or esterified and which, after telomerisation, will lead to the formation of esterified or non-esterified polyacids of the respective general formula:

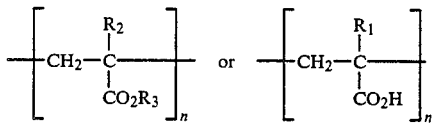

where $R_1$ is such that it defines as taxogen acrylic, methacrylic, chloroacrylic, cyanoacrylic and itaconic acids while $R_2$ and $R_3$ define a glycidyl or aziridinyl acrylate or methacrylate such as 2-(1-aziridinyl)ethyl methacrylate.

To obtain telomers from these taxogens it is necessary to have a telogenic agent which, particularly in industrial applications, should desirably have a good coefficient of transfer, that is to say, should react as completely as possible.

The choice has fallen on mercaptans of the general formula $B(SH)_\beta$ where S refers to the sulphur atom, $\beta$ is a coefficient with a value of 1 or 2 according to whether there are mono or disulfide derivatives, and B an organic radical.

Thus telomerisation by these telogens leads, in the case of a disulfide compound and an acid as the taxogen, to the telomer of the general formula:

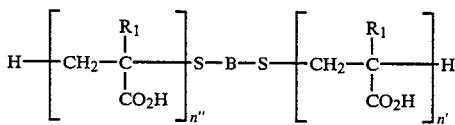

wherein —B belongs to the group comprising disubstituted arylene, alkylene and polysiloxane chains. But it is equally possible to use monosulfide derivatives where —B belongs to the group comprising aryls, substituted aryls, alkylenes containing 1 to 18 carbon atoms, fluorinated alkyls of the —$CH_2$—$CH_2$—$C_nF_{2n+1}$ type, thioglycolic acid or thiomalic acid.

However, dodecanethiol $C_{12}H_{25}SH$ is preferred in many applications.

The invention has to do with telomers which can be cross linked by light, that is to say, grafts are fixed on the esterified or non esterified acid functions of the telomers obtained, the grafts having at least one double bond adapted to open by the action of radiation so as to establish "bridges" between at least two grafts and thus effect the desired cross linking.

The grafts are fixed not on all the molecules of taxogen but on a fraction of them, so that the grafted telomer has properties bound up both with the acid functions of the taxogens and with the photocrosslinkable functions of the grafts.

Several types of graft may be used, and these are divided into two categories according to what function the taxogen has. Thus if the taxogen has a free acid function, the grafted product has a glycidyl or aziridinyl group; if on the other hand the taxogen is a glycidyl or aziridinyl acrylate, the grafted product then has an acid group.

So it will be realised that in either case there will be either a glycidyl group or an aziridinyl group, that is to say, a group of the type

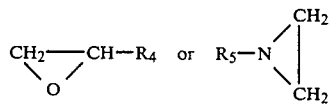

present in the grafting reaction. It is in fact by means of these groups that the bond between the taxogen and the graft is formed by an addition reaction. A reaction of this type has the advantage of leading to relatively high grafting speeds, which do not require any thermal activation and consequently avoid any premature cross linking. Grafted telomers are thus obtained and, if the initial taxogen has a free acid function, they are of the general formula:

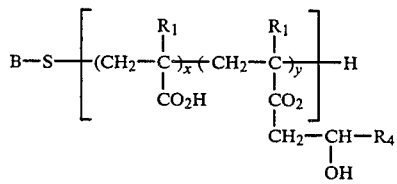

or

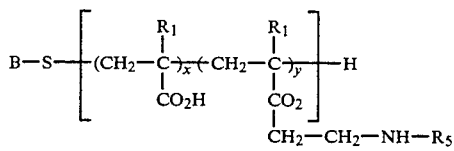

where $R_4$ and $R_5$ have at least bond which can be cross linked by light.

The grafts used include:
when the taxogen is an acid: acrylates, methacrylate, cinnamate, cinnamylidene, furylacrylate, glycidyl allylate, allyl and glycidic ether, 2-(1-aziridinyl)ethyl acrylate and methacrylate, 3-(1-aziridinyl)propyl acrylate and methacrylate, 4-(1-aziridinyl)butyl acrylate and methacrylate, 6-(1-aziridinyl)hexyl acrylate and methacrylate and 8-(1-aziridinyl)octyl acrylate and methacrylate.
when the taxogen is an acrylate of the glycidic or aziridinic type; acrylic, methacrylic, cinnamic, cinnamylidic and furylacrylic acids.

It should be noted that the telomers thus obtained may also act as telogenic agents in reactions with taxogens $Y_i$, giving rise to the formation of dual-sequence cotelomers. The taxogens $Y_i$ may be acrylates, particularly such as butyl, ethyl 2-hexyl or vinyl acrylate.

The invention is also concerned with a method of synthesizing the grafted telomers.

The method has to do with the telomerisation proper and the method of carrying out the grafting.

Like any method designed for industrial use, it must preferably lead to high conversion yields, the reaction speed must be high enough and the products obtained must be of a constant composition so that they have the required properties in a given application.

With regard to telomerisation, given the telomers used, Applicants can resort to a method where polymerisation is effected by radical initiation, thus avoiding the drawbacks of colouring of the products, which are inherent in reactions effected by redox catalysis in the presence of $FeCl_3$. The choice of dodecanethiol makes it possible to have much higher conversion yields, by virtue of its coefficient of transfer $C_T$ which is 10 times higher than that of the halogen compounds such as bromotrichloromethane. The most important improvement is the possibility of producing telomers which have the desired degree of polymerisation with a low polydispersion index.

As previously pointed out, in discontinuous reactions such as those carried out hitherto, the compounds formed at the beginning of the operation do not have the same degree of polymerisation as those obtained at the end. These types of reaction are in fact governed by MAYO's equation:

$$\frac{1}{\overline{DPn}} = \frac{1}{\overline{DPo}} + C_T R$$

which shows that $\overline{DPn}$, the mean degree of telomerisation as a number, is a function of $\overline{DPo}$, the degree of polymerisation in the absence of any transfer, of the coefficient of transfer at the telogen $C_T$ and of R, the ratio of the molar concentration of telogen to that of the taxogen. Since this ratio varies according to how far the reaction has advanced, it will be seen that the $\overline{DPn}$ is not constant. Hence the statistical means of the degree obtained may be the degree desired, but it is only the resultant of degree the values of which may be very far from the average.

Such products with the same $\overline{DPn}$ may have different properties and may not meet the requirements desired by the user (applicateur). Applicants have therefore endeavoured to perfect a process in which a specific $\overline{DPn}$ is certainly obtained but also the lowest possible polydispersion index.

There are several ways of obtaining products which are as homogeneous as possible:
either to fractionate the mixture obtained, after the reaction
or to stop the operation at a conversion rate of approximately 10% so as not to leave the initial $\overline{DPn}$.

These two ways are unsatisfactory from the point of view of profitability.

Applicants have also attempted to establish kinetic equations which will reveal how the concentrations of reagents evolve in the course of time. They have established the following process on the basis of this data: the starting material is a mixture of taxogen, telogen and initiator dissolved in a solvent in a telogen/taxogen ratio corresponding to the required $\overline{DPn}$. The mixture is brought to and kept at 70° C. in a stream of nitrogen. A mixture is continuously introduced, containing the reagents in a quantity and at a speed such that they enable the ratio R to be kept within a range of values which narrows when low polydispersion is desired.

It should be noted that by this method all the reagents added are converted to telomers, that this takes place at virtually constant speed throughout the reaction, and that the quantities consumed are directly bound up with the quantities of reagents included in the reaction at the beginning.

The initiator chosen by Applicants is azobisisobutyronitrile. Although less effective than peroxides, it is distinctive in having a decomposition speed which is virtually independent of the solvent and relatively little decomposition energy; this makes it possible to carry out reactions at temperatures of approximately 60° C. and with a negligible coefficient of transfer to the initiator, thereby minimising parisitic reactions.

As far as the solvent is concerned, Applicants have retained acetonitrile, which has good solubilising power for the reagents used and a low transfer constant relative to that of the telogen. Furthermore, in cases where the taxogen is acrylic acid, this solvent precipitates virtually all the telomers, thus facilitating industrial treatment of the finished products.

In addition, the reaction is carried out in nitrogen so as to avoid the presence of oxygen, which inhibits radical polymerising reactions.

With regard to grafting, Applicants have also contributed to improving the prior method, where it is necessary to pass through the acid chlorides stage in order to fix the photocrosslinkable molecules on the acrylic acid forming the taxogen. This additional phase has been eliminated by resorting to molecules containing glycidyl or aziridinyl groups.

The reactions which take place are as follows, in the case of the dodecanethiol/methacrylic acid telomer with glycidyl methacrylate

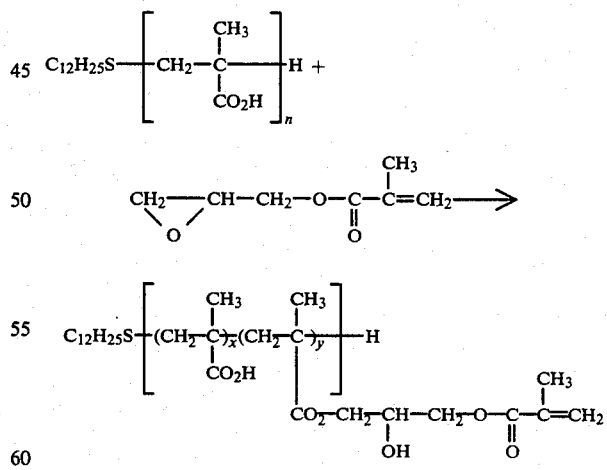

This reaction takes place in the presence of a catalyst, N,N-dimethyllaurylamine at 60° C.; this is a relatively low temperature which avoids any premature cross linking between grafts, but which nevertheless makes it possible to reach grafting speeds three times higher than in prior art.

with 2-(1-aziridinyl)ethyl methacrylate

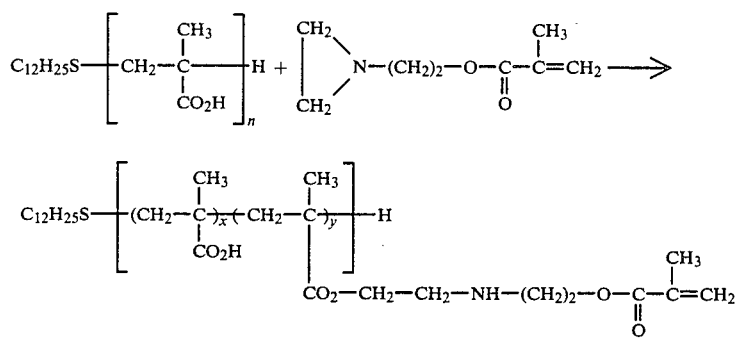

The same catalyst and the same temperature range as above may be used, again leading to improved speeds.

The invention will be understood better from the following synthesising examples, which do not limit its scope.

EXAMPLE 1

Radical Telomerisation of Methacrylic Acid with Dodecanethiol

The reaction mixture is prepared in a 250 ml volumetric flask into which the following are successively placed: 21.52 g of methacrylic acid, i.e. 0.25 mole; 10.12 g of dodecanethiol, i.e. 0.05 mole (giving a molar ratio of telogen to taxogen R of 0.2); and 8.82 g of 1,2-dichlorobenzene. The volume is then adjusted exactly to 250 ml with acetonitrile, then placed in a 500 ml three neck balloon flask fitted with a cooler, a thermometer and a system for bubbling through nitrogen, and brought to 70° C. while the solution is simultaneously deoxygenated. Once the temperature is reached, 0.821 g of AIBN (azobisisobuytronitrile), i.e. 0.005 mole, is added to the medium and samples are taken after various periods of time.

The various degrees to which the reactions have advanced ($\alpha$) are measured by chromatography in vapour phase, using 1,2-dichlorobenzene as the internal standard.

The degrees of polymerisation ($\overline{DP}_n$) are measured by chromatography by gel permeation, giving a method developed on the telomers. In the above example the $\overline{DP}_n$ is equal to 8 for conversion rate of 90%.

EXAMPLE 2

Semi-continuous Radical Telomerisation of Methacrylic Acid with Dodecanethiol

A 3 liter 3 neck balloon flask is used, placed in an oil bath which is kept at 70° C. by a thermostat, and fitted with a cooler, a mechanical agitator and a system for continuously introducing the reagents in nitrogen. An initial solution is placed in this flask, comprising 172.18 g of methacrylic acid, i.e. 2 moles; 121.44 g of dodecanethiol, i.e. 0.6 mole; and acetonitrile to bring the volume to 2 liters. The reaction mixture is brought to 70° C. while nitrogen is bubbled through. Once the temperature has been reached, 9.85 g of AIBN (azobisisobutyronitrile) is added to the medium. For 6 hours starting from this moment, 2.21 ml per minute of a solution made up of 575.6 g of methacrylic acid, 189.14 g of dodecanethiol and 7.97 g of AIBN is added by means of a peristaltic pump.

The various masses are calculated as follows: a variation of $\alpha$ is stipulated, for which the composition of the telomer may be compared with the composition obtained at the outset (in theory $\alpha=0.1$). During the period of time in seconds corresponding to this degree of advancement, the consumption of monomer, telogen and initiator is noted (for 1 mole of monomer included in the reaction).

$Q_1$, $Q_2$ and $Q_3$ are taken as the respective consumptions and, since the operation is expected to take 6 hours, a readjusting solution is prepared, made up of:

| | |
|---|---|
| $Q_1 \times \frac{6 \times 3600}{t}$ | monomer |
| $Q_2 \times \frac{6 \times 3600}{t}$ | telogen |
| $Q_3 \times \frac{6 \times 3600}{t}$ | initiator |

EXAMPLE 3

Cotelomerisation of Acrylic Acid with 2-Ethyl Hexyl Acrylate and with Dodecanethiol 50.4 g of acrylic acid (0.7 mole), with 55.3 g of 2-ethyl hexyl acrylate (0.3 mole) and 5 g of azobisisobutyronitrile (0.03 mole), are placed in 500 ml of acetonitrile. 20 g of dodecanethiol is added, giving a ratio R=(Telogen)/(monomer) of 0.1. The mixture is brought to 70° C. in a stream of nitrogen for 6 hours. After evaporation 125 g of a compound of the following structure is obtained:

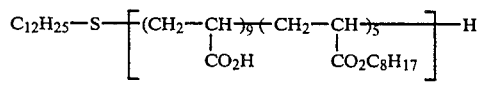

EXAMPLE 4

Telomerisation of Glycidyl Methacrylate with Thiophenol 0.5 mole of glycidyl methacrylate and 0.1 mole of $C_6H_5$—SH are placed in a Pyrex glass tube. The product is irradiated without agitation, with a 125 watt U.V. lamp located 10 cm away and at a reaction temperature of 40° C. After 6 hours' reaction a compound of the following structure is obtained:

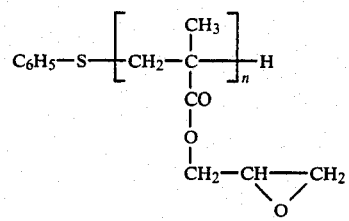

The yield is 90% and the $\overline{DP}_n$ by GPC chromatogram is 4.5, whereas by RMN analysis it is 4.3, a very consistent result.

EXAMPLE 5

Telomerisation of Methacrylic Acid with a Dithiol 86 g of methacrylic acid together with 48 g of 1-9 nonanedithiol and 2 g of azobisisobutyronitrile are placed in tetrahydrofuran (300 ml), and the reaction mixture is brought to 70° C. for 6 hours.

After evaporation and precipitation in pentane 120 g of telomer is obtained.

RMN and elementary analysis reveal a compound of the structure

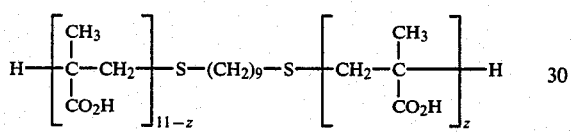

EXAMPLE 6

Grafting Glycidyl Methacrylate onto Telomers of Methacrylic Acid with Dodecanethiol These reactions have generally been carried out in a 1 liter inactinic balloon flask with a cooler at the top, the flask being placed in an oil bath set to 60° C. 150 g of telomer, $\overline{DP}n$ 8, i.e. 0.168 mole; 191.4 g of glycidyl methacrylate, i.e. 1.348 mole; 23.0 g of N,N-dimethyl lauryl amine, i.e. 0.108 mole and 500 ml of tetrahydrofuran are successively placed in the flask. When the mixture has been homogenised, 20 ml is taken out for the control batch (manipulation) and 3.8 g of 1,2-dichlorobenzene is added to it. The mixture is placed in a 50 ml inactinic balloon flask then the two batches are reacted at 60° C. for 24 hours. When part of the solvent has been removed, the product is precipitated in petroleum ether. After filtration and drying cold in vacuo ≈280 g of grafted telomer is recovered.

EXAMPLE 7

Grafting Acrylic Acid onto the Telomers of Glycidyl Methacrylate with C₆H₅—SH

As above in example 6, 80 g of telomer of the formula:

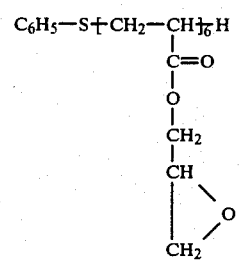

is introduced into 500 ml of tetrahydrofuran with 18 g of N,N-dimethyl lauryl amine, then 100 g of acrylic acid is added. The mixture is brought to 60° C. for 15 hours and, following precipitation in pentane, 120 g of statistical cotelomer of the following structure is obtained:

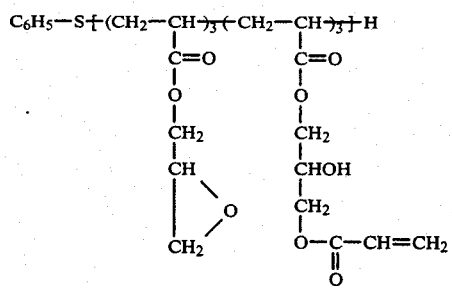

EXAMPLE 8

Grafting 2-(1-Aziridinyl)Ethyl Acrylate onto Telomers of Dodecanethiol with Methacrylic Acid In an apparatus as described above, 100 g of telomer is placed in 300 ml of tetrahydrofuran

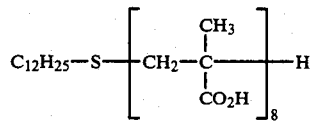

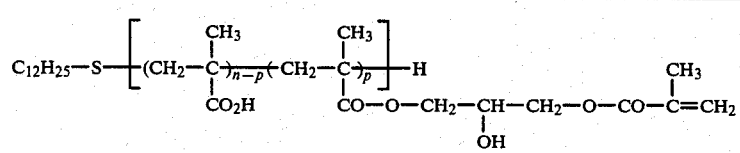

| DPn of starting telomer (n) | Quantity of telomer (g) | Quantity of glycidyl methacrylate (g) | Quantity of lauryl amine (g) | Quantity of solvent (ml) | Quantity of product contained | p |
|---|---|---|---|---|---|---|
| 8 | 150 | 191.4 | 23 | 500 | 280 | 7 |
| 8 | 105 | 67 | 16 | 380 | 165 | 4 |
| 4 | 130 | 67.9 | 16.2 | 430 | 170 | 2 |

6 g of triethyl amine is then added and the mixture brought to 60° C. 25 g of aziridinic compound of the formula

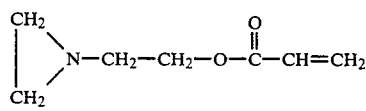

is added in two stages, and the reaction is continued for 8 hours. The product of the reaction is precipitated in petroleum ether and 120 g of compound of the following structure is obtained

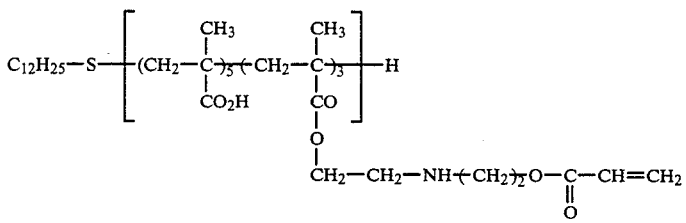

The invention also relates to applications of the telomers claimed and more particularly to their use in the field of protecting metals, particularly such as aluminium and its alloys.

It has been seen above that the grafting of the telomers involved a varying fraction of the molecules of taxogen, so that in the case of polyacids free acid functions were left. These functions have properties of adhesion to metal substrates, so telomers devoted to coating problems are usually grafted so that the proportion of grafting is limited and generally below 60%.

The telomers obtained in the preceding syntheses are solids. Their application to metal necessitates fluidity, which is obtained by dissolving them, with a maximum content of 50% by weight, in a comonomer such as ethylene glycol acrylate (or hydroxy-2-ethyl acrylate=HEA) so as to form a varnish. A few % by weight of a photosensitiser is generally added.

When the substrate has been thus varnished, cross linking and polymerisation are carried out, also known as "hardening", by means of a lamp emitting a power of 120 watts/cm, the emission spectrum being centred on the band of wavelengths between 200 and 600 nm, with the lamp approximately 5 to 10 cm away from the substrate. Drying takes place in less than 1 second for a final coating thickness from 6 to 11 μm. The coating has good resistance to solvent (methyl ethyl ketone) and its properties of spread, glossiness, adhesion, pencil hardness and resistance to sterilisation are appropriate.

As compared with prior art telomers, the telomers of the invention have remarkable properties of flexibility, by virtue of their thiol chain provided by the telogenic agent, resulting in improved resistance to the mechanical stresses to which the substrates are subjected.

The telomers may equally be used in the form of lacquers, that is to say, pigmented coatings, or adhesives to form complexes of the plastic film/metal type. In this case cross linking is brought about not by irradiation with photons but with electrons emitted by a high voltage generator.

Some specific applications will now be described by way of example.

EXAMPLE 9

Colouring Varnish

Application to aluminium foil, type 1050 or 8011 according to the standards of the Aluminium Association, thickness 40 μm, designed inter alia for making milk bottle tops.

This application requires the varnish to have direct adhesion to annealed aluminium, a capacity for deformation by pressing to only small depths, and resistance to sterilisation for 1 hour at 120° C.

The most appropriate formula is a varnish which is based on a telomer based on methacrylic acid grafted by glycidyl methacrylate, where the telogen is a long molecule: dodecanethiol. The $\overline{DPn}$ is 8 and the proportion of grafting by the glycidyl methacrylate is 47%.

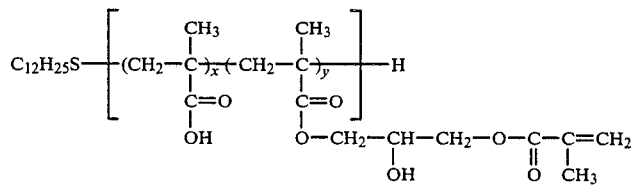

The formula used comprises:

| | |
|---|---|
| Telomer | 46 parts by weight |
| Ethylene glycol acrylate (HEA) | 54 parts by weight |
| Photoinitiator Darocur 1173 | 3 parts by weight |
| Phthalocyanin blue | 15 parts by weight |

The formula here is very reactive, since hardening takes place with the material passing under a 120 W/cm ultra violet lamp at 30 m/minute.

Resistance to friction with methylethyl ketone (MEC) is good (>100 reciprocations), adhesion to aluminium is good (10/10) and so is resistance to sterilisation.

In the Ericksen pressing test (h/d cup=0.6) only the top of the skirt does not adhere perfectly. In addition the coating is hard: in the pencil test 2H is recorded.

It should be mentioned that this formula gives direct adhesion to metal far superior to that of known commercial formulae.

EXAMPLE 10

Offset Inks and Varnishes for Aerosols and Tubes

The external decoration of aerosols and flexible tubes takes place in two stages; in the first place a white coat or a white lacquer is deposited, being applied by roller to the rotating cylinder (aerosol or tube). This first layer is hardened in an oven. Then the decorative motif is deposited over the white coat by means of inks of four different colours. So-called "offset dry" inks are used for the purpose and are placed on a block then on a blanket, from which they are transferred to the aerosols or tubes. A superimposing varnish is often applied over the inks. The whole article is hardened by baking in an oven.

The offset inks and superimposing varnish may be formulated with the telomers or cotelomers.

The advantage of such formulae over those requiring thermal baking is that a long period spent in an oven (10 to 15 minutes at 180° C.) is replaced by extremely brief hardening by electrons; in the latter case the coated cylinder (aerosol or tube) placed on a transfer chain arrives in front of the window of an electronic generator, where it is kept rotating on itself for a very short period.

The telomer of acrylic acid with $\overline{DPn}=8$, grafted to 47% with glycidyl acrylate, is used for the offset inks.

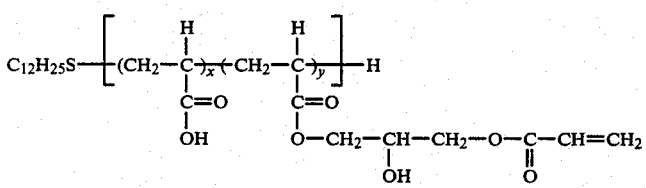

The formula used is as follows:

| | |
|---|---|
| Telomer (solid) | 60 parts by weight |
| Trimethylol propane triacylate (TMPTA) | 10 parts by weight |
| HEA | 11 parts by weight |
| Coloured pigment | 15 parts by weight |
| Wax additive | 4 parts by weight |

EXAMPLE 12

Paints for Prelacquering (Coil Coating)

Prelacquering on steel or aluminium is a widely practised method, employed, e.g. for making plates for caravans, boarding for the building industry and plates for electrical household appliances.

Strip material of variable thickness and width is used, passing continuously along a treatment line at speeds of 40 to 100 m/minute. The strip is first degreased, undergoes chemical conversion treatment (phosphatisation, chromating), then receives one or more layers of paint which are applied by a lacquering device with rollers, and finally passes into an oven where the paint is hardened.

In practice either one coat of finishing paint is applied or in so-called two-coat lines a primer plus a top coat.

Baking ovens, generally with air convection are very long and bulky. Hardening lacquers with an electron generator, which may very easily be incorporated in the line, considerably shortens the lacquer hardening zone.

It should be recalled that prelacquering paints, all of which contain opaque pigments, can be hardened by radiation only by means of electron generators.

It is very difficult to have good direct adhesion to aluminium treated by chemical conversion by means of electron-hardened lacquer formulae. In addition, lacquers thus obtained generally have insufficient flexibility to accept the shaping which the plates subsequently undergo.

The advantage of formulae based on photocrosslinkable telomers is precisely that the necessary adhesion and flexibility can be achieved, in contrast with the other, radiation-hardened lacquers which are at present commercially available. However, given that the conversion layer based on chromates or phosphates sometimes leads to incompatibility with some telomers, it is preferable to apply a primer of the water-based epoxy or acrylic type to the conversion layer, with conventional baking in a very thin layer of approximately 3 μm, before the coat to be hardened by radiation is deposited.

The telomers used for this application are based on methacrylic acid grafted with glycidyl methacrylate. It has been seen that, from the point of view of the final properties of the coating, it is important to be able to juxtapose in the constitution of the polymer a reactive grouping, that is to say, a grouping containing double bonds, and an inactive grouping which is long enough to give the paint good flexibility.

In this case the telogen is indeed a long straight chain, dodecanethiol.

The degree of polymerisation of such a molecule may be variable, preferably from 4–6 or 8, and the proportion of grafting by glycidyl methacrylate must not be too high; it has been chosen at about 50%, thus allowing both for a high hardening speed and good flexibility of the coating.

The telomer is thus of the following formula:

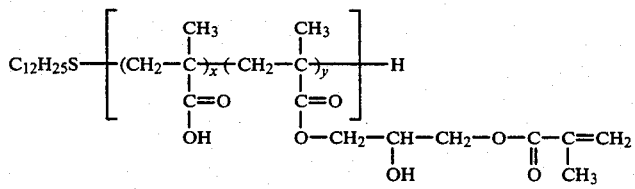

The degree of polymerisation is here=4 with substantially x=y=2.

An example of the paint formula is given below:

| Telomer | 46 parts by weight |
|---|---|
| HEA | 48 parts by weight |
| Tetraethylene glycol diacrylate | 6 parts by weight |
| Titanium oxide pigment | 70 parts by weight |
| Spreading agent | 1.5 part by weight |
| Surfactant | 0.02 part by weight |

The film of paint, thickness ~20 microns, is hardened well by electrons with a dose of 3 Mrads, the accelerating voltage being 160 kV, then resistance to friction MEC>100 reciprocations is obtained. Adhesion is very good: 10/10 in the squaring+shock+Scotch tape test; pencil hardness is H-2H; flexibility is good to judge by the Erichsen pressing test and by the test of folding on a conical mandrel (ASTM standard D 522) where a value of 1e is obtained.

In the saline mist test, finally, no pitting or unsticking is observed on the cross after 1000 hours' exposure.

We claim:

1. Telomers which can be cross linked by light, of the general formula

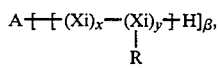

wherein Xi is a taxogen which is an acrylic acid or an ester thereof, R is a organic group which has at least one double bond which can be cross linked by light, x+y is less than or equal to 100 and A and H are the elements of a telogen, $AH_\beta$, wherein $AH_\beta$ is a mercaptan where A has the formula $BS_\beta$ where B is an organic group and $\beta \leq 2$, and wherein (1) taxogen Xi is an acrylic acid selected from the group consisting of acrylic, methacrylic, chloroacrylic, cyanoacrylic and itaconic acids, and group R is produced by grafting a compound selected from the group consisting of glycidyl acrylate, glycidyl methacrylate, glycidyl cinnamate, glycidyl cinnamylidene, glycidyl furylacrylate, glycidyl allylate, 2-(1-aziridinyl)ethyl acrylate and methacrylate, 3-(1-aziridinyl)propyl acrylate and methacrylate, 4-(1-aziridinyl)butyl acrylate and methacrylate, 6-(1-aziridinyl)hexyl acrylate and methacrylate and 8-(1-aziridinyl)octyl acrylate and methacrylate; or (2) taxogen Xi is an acrylic acid ester selected from the group consisting of a glycidyl acrylate, an aziridinyl acrylate, glycidyl methacrylate, and 2-(1-aziridinyl)ethyl methacrylate, and group R is produced by grafting a compound selected from the group consisting of acrylic, methacrylic, cinnamic, cinnamylidic, and furylacrylic acids.

2. The telomers of claim 1, characterised in that the telogen is thioglycolic acid or thiomalic acid.

3. The telomers of claim 1, characterised in that $\beta$ is equal to 1 and, B is selected from the group consisting of aryls, substituted aryls, alkylenes containing 1 to 18 carbon atoms and fluorinated alkyls of the formula $-CH_2-CH_2C_nF_{2n+1}$.

4. The telomers of claim 1, characterised in that the telogen is dodecanethiol.

5. The telomers of claim 1, characterised in that $\beta$ is equal to 2, and B is selected from the group consisting of polysiloxane, alkylene and disubstituted arylene chains.

6. A method of preparing the telomers of claim 1, wherein a process of radical initiation is employed, comprising forming a starting material comprising an initial mixture of taxogen, telogen and initiator dissolved in a solvent, where the molar ratio of telogen to taxogen corresponds to the desired DPn, bringing said mixture to and maintaining said mixture at a temperature below 70° C. in a stream of nitrogen, then continuously introducing into said mixture a second mixture containing said taxogen, telogen and initiator in quantities and at a rate which enables the taxogen to telogen ratio in solution to be maintained within a predetermined range of values, said range being narrower when low polydispersion is desired, to form a telomer product.

7. The method of claim 6, characterised in that the initiator is azobisisobutyronitrile.

8. The method of claim 6, characterised in that the solvent is acetonitrile.

9. The method of claim 6, additionally comprising grafting of said group R directly on the telomer product in the presence of N,N-dimethyl laurylamine at 60° C.

10. The telomers of claim 1, characterised in that the degree of telomerisation is from 4 to 10.

11. The telomers of claim 1, characterised in that the grafting proportion is from 40 to 60%.

12. A varnish comprising the telomers of claim 1, characterised in that the telomers are dissolved, in quantities of 30 to 50% by weight, in a comonomer.

13. The varnish of claim 12, characterised in that the comonomer is selected from the group consisting of ethylene glycol acrylate and trimethylpropane triacylate.

14. A paint or lacquer comprising the telomers of claim 1.

15. The varnish of claim 12, additionally comprising a photosensitizer.

16. The varnish of claim 14, characterised in that the telomer is crosslinkable by bombardment with electrons.

* * * * *